Aug. 8, 1961 R. G. HOLMAN 2,995,311
METHOD OF WINDING A BALL
Filed Dec. 30, 1957 10 Sheets-Sheet 1

INVENTOR.
RUDOLPH G. HOLMAN
BY Nicholas T Volk
ATTORNEY.

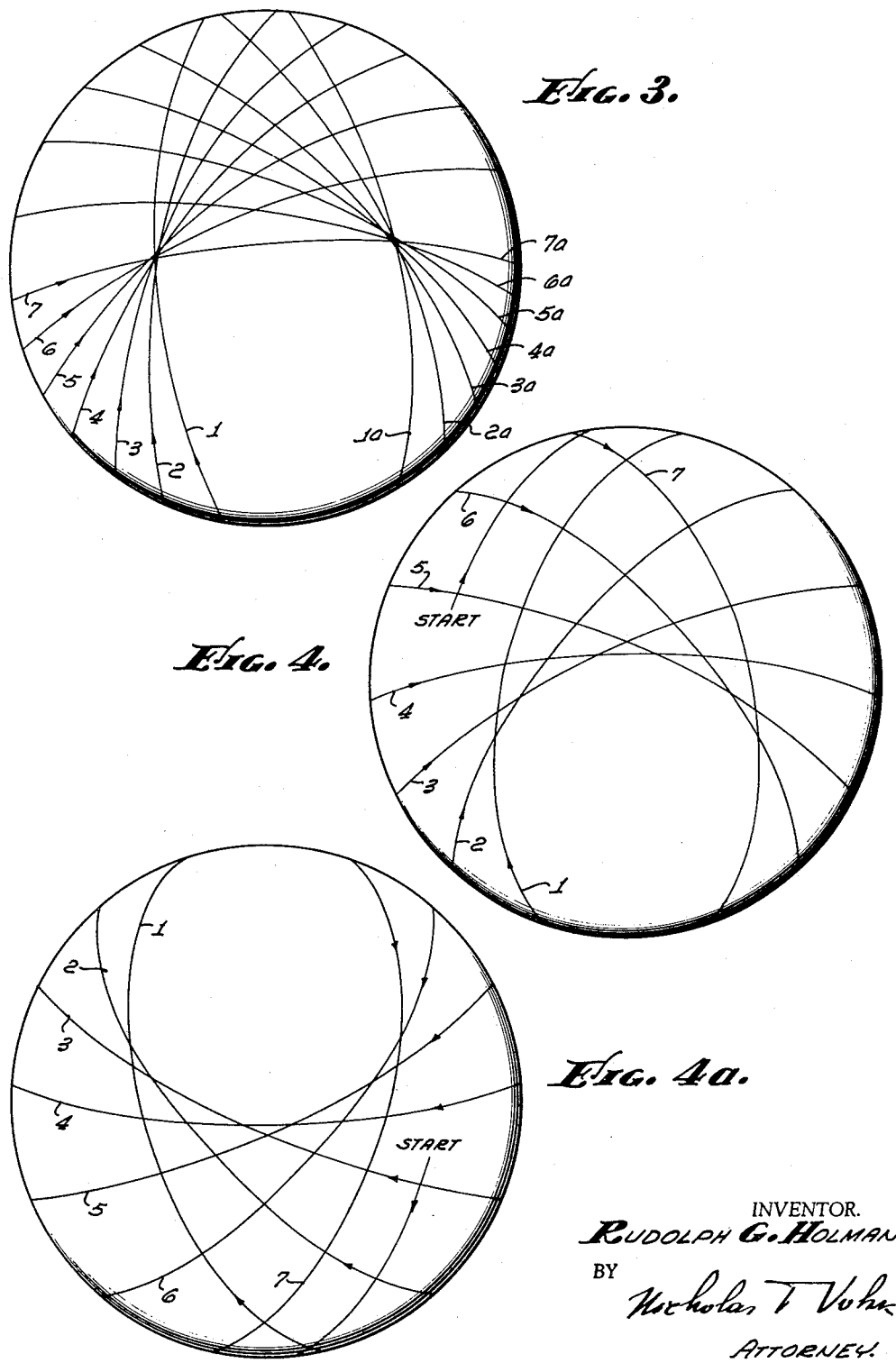

Aug. 8, 1961  R. G. HOLMAN  2,995,311
METHOD OF WINDING A BALL
Filed Dec. 30, 1957  10 Sheets-Sheet 3

INVENTOR.
RUDOLPH G. HOLMAN
BY
Nicholas T Vohs
ATTORNEY.

Aug. 8, 1961  R. G. HOLMAN  2,995,311
METHOD OF WINDING A BALL
Filed Dec. 30, 1957  10 Sheets-Sheet 5

INVENTOR.
RUDOLPH G. HOLMAN
BY
Nicholas T Volk
ATTORNEY.

Aug. 8, 1961  R. G. HOLMAN  2,995,311
METHOD OF WINDING A BALL
Filed Dec. 30, 1957  10 Sheets-Sheet 6
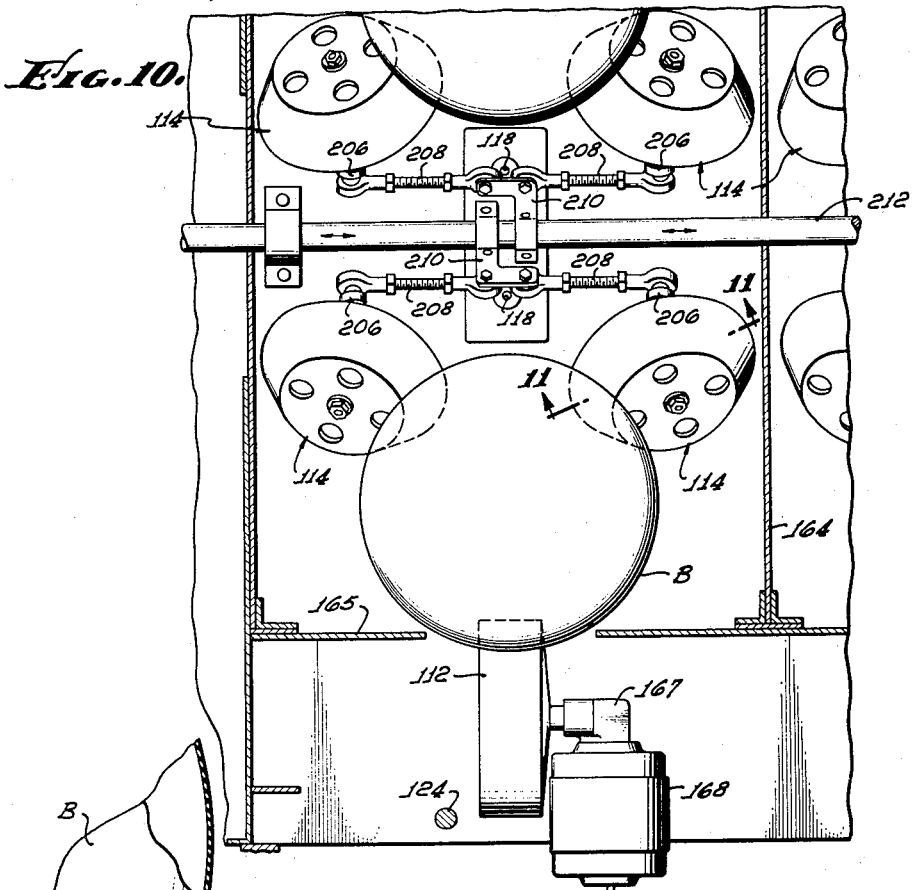
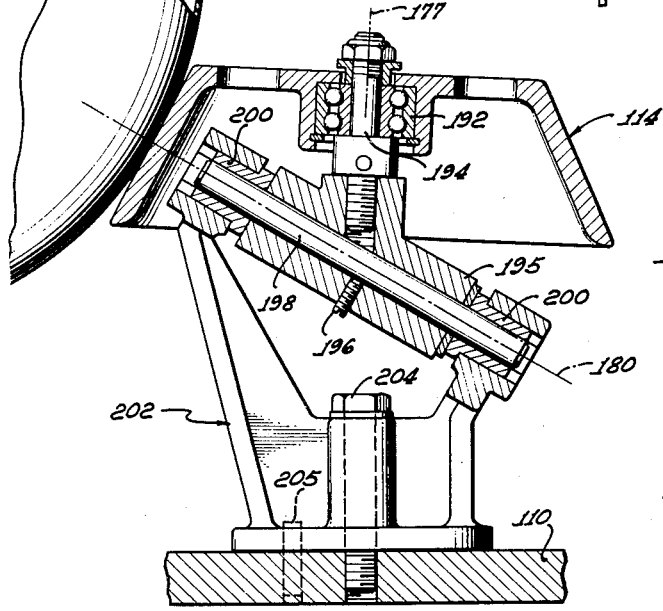
INVENTOR.
RUDOLPH G. HOLMAN
BY
Nicholas T Vohn
ATTORNEY.

INVENTOR.
RUDOLPH G. HOLMAN
BY
Nicholas T. Volk
ATTORNEY.

Aug. 8, 1961  R. G. HOLMAN  2,995,311
METHOD OF WINDING A BALL
Filed Dec. 30, 1957  10 Sheets-Sheet 9

INVENTOR.
Rudolph G. Holman
BY
Nicholas T. Volac
ATTORNEY.

Aug. 8, 1961    R. G. HOLMAN    2,995,311
METHOD OF WINDING A BALL
Filed Dec. 30, 1957    10 Sheets-Sheet 10

INVENTOR.
RUDOLPH G. HOLMAN
BY
Nicholas T. Voluc
ATTORNEY.

United States Patent Office 2,995,311
Patented Aug. 8, 1961

2,995,311
METHOD OF WINDING A BALL
Rudolph G. Holman, La Habra, Calif., assignor to W. J. Voit Rubber Corp., a corporation of California
Filed Dec. 30, 1957, Ser. No. 705,994
14 Claims. (Cl. 242—3)

This invention relates to a method of winding a ball. The invention is applicable to such balls as volley balls, basketballs, baseballs, etc. and also balls which are used as floats, buoys, fish-net balls and other spherical artilces requiring a reinforcing winding or a carcass made of fine string or thread.

For a more detailed description of the apparatus and of the ball per se, reference is made to the divisional applications S.N. 62,257, "A Winding for a Ball," and S.N. 62,293, "A Machine for Winding a Ball," filed October 12, 1960.

The thread windings, or a "winding" as it will be called in this specification (the completed layer of wound thread) fixes the size of the ball and provides a very strong flexible layer on the ball which can resist pressure of air pumped into the ball. Such pressure may be of the order of thirty pounds per square inch and such pressure requires a very strong winding. It is not difficult to specify the parameters of an ideal winding—it should be as light, strong, thin and smooth as possible, and also have the ideal dynamic characteristics. The windings of the prior art constitute a very poor approximation of this ideal goal and it is the principal object of this invention to approach the ideal much closer than the prior art. For example, the weight of the disclosed winding is between 200%–400% lighter than the windings of the prior art, and its tensile strength as measured by the burst pressure, is approximately from 200% to 1000% higher than the balls using a cotton yarn for its winding. Moreover, the balls using cotton yarn suffer from excessive weight, poor shape of the winding, poor external smoothness, excessive thickness of the winding, poor dynamic characteristics and, finally, such windings are more expensive than those produced in accordance with the teachings of this invention.

Other prior art ball windings use a relatively thick nylon cord, which is used for imparting strength to the winding, and combining this cord with the staple yarn—yarn is used in such a case primarily for enabling one to apply effectively the nylon cord which, being slippery, can be held on the surface of the ball effectively only when it is combined with the staple yarn. Balls of this type have the following disadvantages: The winding is thicker than necessary for achieving the desired dynamic and strength characteristics, it is very poorly distributed over the ball's surface, its weight is excessive and, therefore, from the point of view of weight, it is in the same category as the cotton winding. It also suffers, as the 100% cotton cotton winding, from poor stress distribution throughout the thickness of the winding, the inner layers being stressed more than the outer layers of the winding.

It should also be mentioned here that prior art also includes reinforcing membranes made of a fabric material which has an excessive weight, poor dynamic characteristics, high cost because of large waste of the fabric material in the course of making the reinforcing membrane, and many other disadvantages.

All of the above windings, i.e. 100% cotton, nylon-and-yarn and fabric membranes all have poor flexibility characteristics. One of the factors of prime importance for achieving the ideal winding is to have a substantially uniform distribution of the windings over the spherical periphery of the ball with the windings extending in all directions. It is especially important to avoid contour irregularities arising from local concentrations of overlaps of the wound material. It is also structurally important to have the indivadual turns approach as closely as possible great circles. The windings cannot precisely follow great circles, however, since the individual turns are necessarily serially interconnected and consequently continual change in winding direction is necessary for acceptable distribution of the individual turns.

The usual approach to the problem of winding a ball, in so far as the prior art is concerned, is to avoid close control of the individual turns and simply seek random distribution. Such close control as would produce a recognizable predetermined winding pattern is avoided.

The heretofore prevalent procedure for winding a ball, for example, a soft baseball, is to rest the ball structure in a freely rotatable manner on two closely adjacent parallel cylindrical rolls and to rotate the two rolls at equal but opposite angular velocities while simultaneously reciprocating the two rolls longitudinally along their axes. The result is far from such control as would produce an ascertainable winding pattern in which identical winding cycles are continually repeated and in which a definite predetermined relationship between the successive cycles may be detected simply by inspecting a finished ball.

A serious disadvantage of this prior art method, moreover, is that adequately random distribution of the windings requires relatively drastic reciprocation of the two rolls for continually drastic bias of the individual turns away from ideal great circle. Thus, the individual turns of the finished ball are typically wide departures from great circles rather than approximations of great circles and great circle turns are approached only infrequently when the two rollers pause at the limits of their ranges of reciprocation.

The broad object of the present invention is to provide a wound ball with a winding having a highly controlled pattern or a series of highly controlled patterns producing a readily recognizable and accurately predetermined winding turn that results in efficient use of the winding material and obtaining of a very strong and yet thin, flexible and light winding having a very uniform thickness throughout the periphery of the ball, very smooth outer surface and excellent dynamic characteristics. The basic winding pattern may be readily detected in a finished ball since it comprises relatively short accurately predetermined winding cycles which, in the case of the basic pattern, are exactly identical with each other and are successively shifted over the spherical area of the ball in an accurately predetermined manner. Efficiency in the use of a winding material is obtained, first, in the sense of achieving complete, uniform, and exceptionally smooth coverage of the entire ball surface with minimum yardage of very fine thread or cord, and second, in the sense of closely approaching great circles in the individual turns, thus enhancing the individual strength of each turn and its ability to make a maximum contribution to the optimum dynamic characteristic of the finished product.

The disclosed apparatus for applying the winding to a ball is an electronically-controlled apparatus which permits the introduction of a large number of control stations for selecting and modifying each "program cycle" and the number of the program cycles used, or contained, in "the complete cycle." The meaning of these two terms, the "program cycle" and the "complete cycle" will become more apparent from the description of the "programming system," which is the electronic system controlling the mechanical components of the ball-winding machine. Briefly stated, the program cycle is the cycle which determines the number of turns used in the cycle, the position of these individual 360° turns on the outer surface of the ball, the position of the turns with respect to each other within the program cycle and the position of the program cycles with respect to each other on the ball's surface. The program cycle has a winding period, or time interval, and the pause period, the two time periods constituting the complete program cycle. All of the parameters of the program cycle can be varied by means of the programming system and since each individual cycle may be made to be identical to all other program cycles or may be made to differ from all other program cycles, it becomes necessary to introduce the additional term, the "complete cycle" which defines, applies, or describes the number of the individual program cycles included in the complete cycle. By definition, it means that the complete cycle may include a variable number of the program cycles. In the illustrated electronic programming system such number of the program cycles within the complete cycle may vary from 1 to 10 merely because there are ten pairs of program cycle switches and electronic gates in the system. This number of components may be decreased or increased with the corresponding decrease or increase in the number of available variables in the complete cycle.

For the sake of simplicity, it will be assumed in this introductory part of the specification that the program cycle has six complete turns (it may have from 2 to 20 turns with the disclosed apparatus) in each program cycle and that this cycle repeats itself throughout the complete cycle. It should be mentioned here, that the complete winding may include a large number of the complete cycles, such as 8–20, depending on the number of the program cycles in the complete cycle and the type of the desired winding. In the above example, it has been assumed arbitrarily that the complete cycle includes ten program cycles.

With the above simplifying assumptions, each of the successive winding periods within the program cycles comprises a group of turns which may be compared with, and which resemble, a series of intersecting great circles of longitude on a globe representing the earth. Thus, the successive individual turns of a wind period intersect in two diametrically opposite polar regions of the ball, just as the imaginary lines of longitude intersect at the two opposite polar regions of the earth. The transition from one wind period to another is accomplished simply by continuing the final turn of a preceding wind period along a true great circle for a predetermined fraction of a turn during the pause period of each program cycle and then repeating the original wind period with the ensuing successive turns intersecting at a new pair of polar regions. The new pair of polar regions is displaced from the preceding pair by a predetermined distance, and also in a predetermined relative direction, as determined by the duration of the pause period within each program cycle.

While the new winding pattern may be controlled, and predetermined, with high precision, it is, nevertheless, exceedingly flexible in that the pattern and several parameters of the program cycle and of a group of program cycles, constituting the complete cycle, may be widely varied with the aid of an electronic programming system in various definitely known respects within the judgment exercised by those operating the machine.

It is, therefore, an object of this invention to provide a winding method achieved by means of an electronically controlled ball-winding machine which is capable of producing a winding on a ball having a predetermined controllable pattern composed of the previously defined program cycles and complete cycles.

It is an additional object of this invention to provide a method of the above type in which the parameters of the program cycle and of the complete cycle may be varied in a predetermined, predictable manner.

It is also an object of this invention to provide a method of producing a winding on a spherical object which satisfies many desired requirements, such as finite thickness, flexibility, bursting pressure, weight, uniformity of stress-strain characteristics throughout the spherical configuration of the winding and its thickness, dynamic characteristics of a ball when such winding is used for making play-balls, and a number of other features which must be satisfied by the windings of the above type, including reasonable cost, smooth outer surface, uniform distribution of individual turns throughout the winding, and as close an approximation of great circles as possible by the individual turns so long as such approximation constitutes a practicable compromise with the optimum solution of the requirements imposed by the numerous other winding parameters.

The novel features which are believed to be characteristic of the invention, both as to its organization and method of operation, together with further objects and advantages thereof, will be better understood from the following description taken in connection with the accompanying drawings in which several embodiments of the invention are illustrated as examples of the invention. It is to be expressly understood, however, that the drawings are for the purpose of illustration and description only, and are not intended as a definition of the elements of the invention. Referring to the drawings:

FIG. 3 is a plan view of the distribution of turns in a typical program cycle, and especially the type of a polar region which may be employed with the invention;

FIGS. 4 and 4A are additional plan views of another type of the distribution of turns in a single program cycle;

FIG. 10 is a plan, or horizontal view of one station, which view is partly in section taken along line 10—10; illustrated in FIG. 9;

FIG. 11 is a sectional view of an idler roller taken along line 11—11 shown in FIG. 10;

Figure 1:
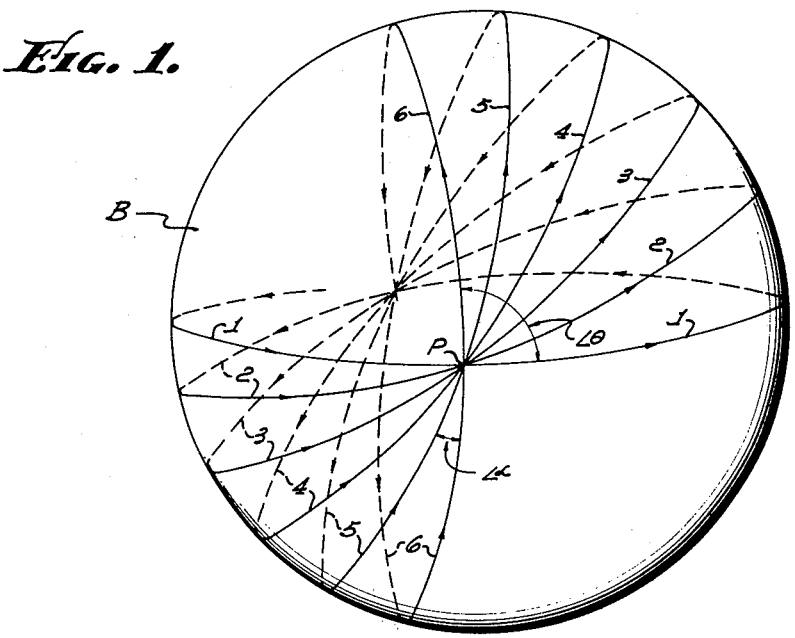
FIG. 1 is a diagrammatic view of a sphere with a group of winding turns constituting a portion of the winding applied during one program cycle.

Referring to FIG. 1, it represents a ball having six turns applied to the ball during the first program cycle, the successive turns of the cycle being numbered 1 to 6. In this particular instance, the illustrated program cycle is of the type in which all of the windings intersect at two polar points P, there being two such polar points at diametrically opposite positions on the periphery of the ball, and the number of turns has been limited to six turns. Moreover, the successive turns of the winding are displaced by an angle $\alpha$ which, in the selected program cycle is equal to approximately 15° as measured by the angles at the polar points P. Thus, the total displacement for this particular program cycle is 90° and the completed winding period of the program cycle covers approximately two diametrically opposite quadrants of the spherical area of the ball. As will be pointed out later, the number of turns, angle $\alpha$ and the locus of points P may be varied in each winding period of each program cycle, the program cycle including the winding period and the pause period. The duration of the pause period can also be varied and it is the duration of the pause period that determines the angular displacement of the "polarized group turns (turns 1 through 6 in FIG. 1) which are produced during the winding period of each program cycle. This will be discussed more in detail in connection with FIGS. 2, 3 and 4.

Figure 2:
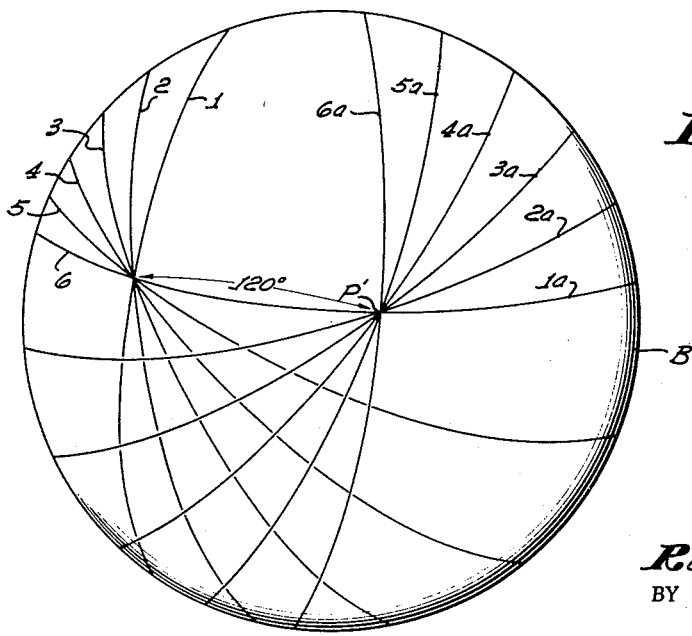
FIG. 2 is a similar view showing a second succeeding winding period of the next program cycle added to the first program cycle to show the geometrical relationship between successive program cycles.

FIG. 2 shows the next succeeding polarized group of turns comprising six identical turns, numbered 1a to 6a, intersecting at a pair of diametrically opposite pole points P'. It is to be noted that the last turn 6 of the first winding program-cycle is continued, the two poles P and P' being spaced apart on the continuation of turn 6. The circular distance P—P' is, of course, a fraction of a circle, and in the selected example angle $\theta$ is equal to 120°. In the same way a third successive polarized group of turns, which is not shown in FIG. 2, would start with the continuation of the turn 6a and one of the poles of the third winding period would be on the turn 6a, the adjacent poles being displaced by 120°. It is apparent that the paths described by the successive pairs of poles will conform to a particular geometrical pattern, the selected pattern of pole migration being such as to achieve the desired uniform distribution of the wound material over the spherical area of the ball. In the above example angle $\theta$ remains constant, angle $\alpha$ remains constant and $n$ also remains constant, where $n$ is the number of complete turns produced during time $t_w$, where $t_w$ is the duration of the winding period of the program cycle. As stated previously, all of the above parameters, $n$, $t_w$, $\theta$ and $\alpha$ can be varied in the manner described below.

Before concluding the description of the selected program-cycle, it may be helpful to discuss more in detail the concentration or dispersion of the intersections at the two polar regions formed of a winding program-cycle. In the disclosed program cycles, maximum concentration is achieved when the intersection of the successive turns of a single winding period takes place at two precise polar points, as shown in FIGS. 1 and 2. Lesser concentration of the intersections is accomplished by dispersal of the successive intersection points over a polar region, as shown in FIG. 3, and a still lesser concentration is accomplished when the region of concentration is extended over a curved line, as illustrated in FIG. 4. In practice, the intersection is of the type shown in FIG. 3, along an area 300 indicated by a dotted line 301 because of minor variations in slippage that takes place between the ball and the driving mechanism. It is also possible to obtain a much larger dispersion illustrated in FIG. 4 which will be described later after concluding the description of the winding machine.

It is possible, of course, to pile up excessive intersections at local points by deliberately seeking to do so and using a large number of turns for each winding period of a single program cycle. If the polar intersections are dispersed in the general manner shown in FIG. 3, however, there is great latitude in the number of turns that can be used for each winding period. It is possible, too, to cause the poles to overlap with undesirable effects on the surface of the ball, i.e., the surface in such a case loses the desired smoothness and continuity, and in an extreme case, transforms the desired perfect sphere into an ellipse, such as a football.

In the disclosed method, however, there is a complete control over the distribution of the poles so as to obtain a completely uniform distribution of the successive polar regions over the entire spherical area of the ball with the concomitant advantages, such as strength and smoothness of outside surface in spite of the thinness and lightness of the winding's layer and very fine thread used in producing the winding. The thread may of the order of from .001" to .008". The official weight of a basketball is 21 ounces with a tolerance of plus or minus one ounce. By making the weight of the completed winding smaller, without sacrifice in strength (as mentioned previously, the subject winding, actually, is stronger than some of the windings of the prior art) it is possible to increase either the weight of the inner bladder, or the weight of the outer cover, or both, as may be desired, without exceeding the regulation weight. When the usual twisted large diameter thread or cord is used, as taught by the prior art, the need for complete coverage of the outer surface with the cord requires the use of an excessive amount of the winding material to provide adequate surface coverage with the cord, with the result that too little weight is left for making the bladder and the outside cover.

The additional advantages of the winding produced in accordance with the teachings of this invention may be summarized as follows:

(1) While the nylon thread is more costly per pound than the usual winding material, there is so much less weight required for superior coverage and superior strength that there is actually a marked saving in cost of the winding.

(2) The larger the number of well distributed turns in a winding layer, the nearer the finished layer approaches uniformity in strength, thickness and smoothness of the outer surface of the winding. The wound layer of a basketball produced (as herein taught) according to the invention has many times as many turns as found in the usual wound ball and the strength of the winding is also many times stronger than that of the balls with coarse thread winding and haphazard distribution of the thick cords used for marking the winding.

(3) The wound layer of nylon provides a relatively thin carcass for the ball. A relatively thin wound carcass is less likely to fatigue and fail than a relatively thick wound carcass because less internal friction and stress in compression and tension are involved in the flexing of a thin layer than in the stressing of a thick layer. It is also to be pointed out that the more systematic and efficient the distribution of the winding material, with more strands per unit area, as provided by the present invention, the less the possibility of local weakness, developing anywhere in the carcass. Since the new carcass is relatively light in weight, longer life is obtained within the total weight limitation, by either thickening the bladder or the cover, or both, as mentioned previously.

(4) The use of a relatively thin wound layer composed of a fine nylon thread, makes it possible to obtain substantially uniform tensioning of the inner as well as of the outer layers of the winding, and uniform stress distribution in the finished ball in a manner not possible with thicker wound layers of the prior art. If an inflated bladder is wound with a strand under tension, the outer wound layers tend to remove the tension of the inner layers. On the other hand, if the strand is wound under substantially no tension, the expansion involved in the final cure of the ball places the inner windings under a higher tension than the outer winding and leaves the outer windings relatively slack. This effect may be understood when it is considered that the inner windings are subjected to a higher percentage of circumferential expansion than the outer layers. The present invention solves this dilemma, in part, by using a thin wound layer to narrow the circumferential differential between the inner windings and the outer windings; and, in part, by winding the strands under appreciable tension to cause a certain degree of relaxation of the inner windings which is automatically removed in the subsequent high pressure expansion for the final cure.

(5) Since there is a substantial saving in weight and thickness of the wound layer, it is possible to impregnate the wound layer with bonding cement or glue and still keep the total weight of the wound layer relatively low. The impregnating material may be primarily a bonding cement, glue, an adhesive, or a sealing material for air retention. In the preferred practice of the invention a suitable adhesive is sprayed into the ball as the newly laid nylon strand is laid in the winding operation. The sprayed material anchors the wound thread in place and in addition impregnates the thread.

BALL-WINDING MACHINE

(Mechanical portion)

Figure 18:
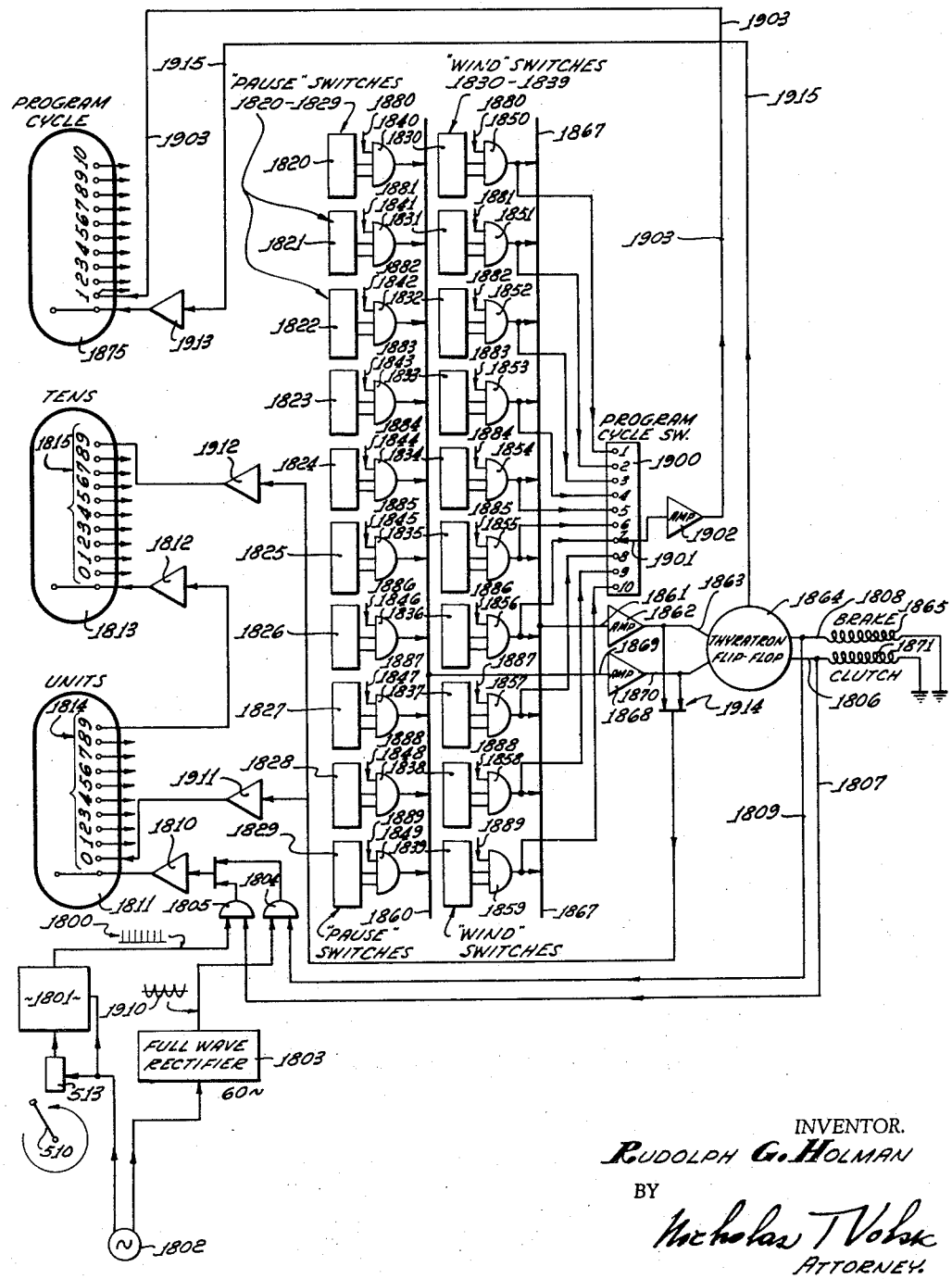
FIG. 18 is a block diagram of the electronic programmer for selecting and, once the selection has been made, controlling the program cycles and the complete cycle.

Proceeding now with the description of the winding apparatus, FIGS. 5 through 11 disclose the mechanical portion of the ball winding machine which is controlled by the electronic programmer illustrated in FIG. 18.

Figure 5:
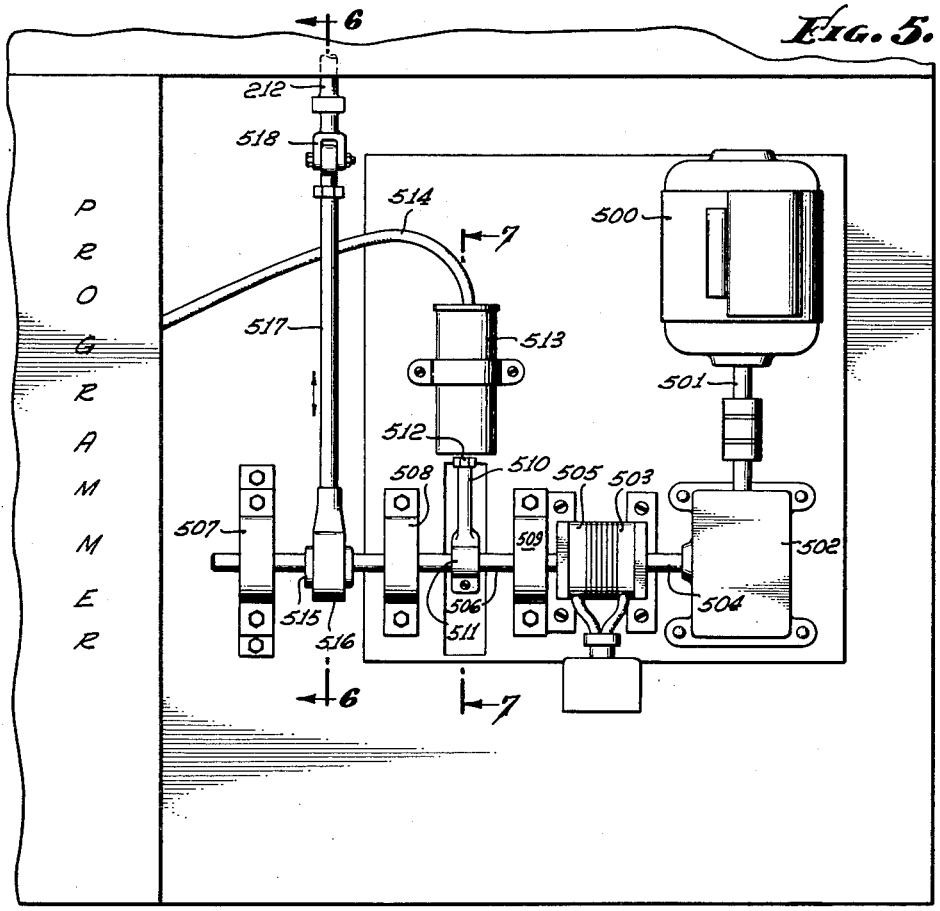
FIG. 5 is a plan view of the drive mechanism for a reciprocating rod including the driving motor, computer-controlled clutch and brake, a revolutions pulse generator, a cam and the reciprocating rod.
Figure 6:
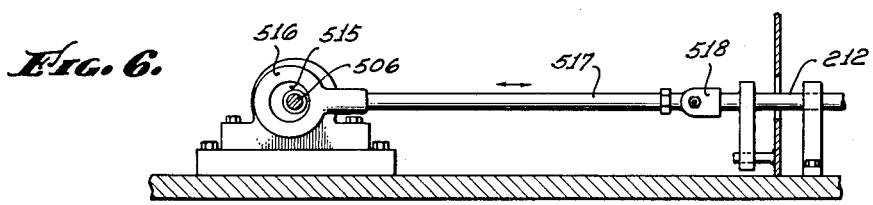
FIG. 6 is a side view of the cam shown in FIG. 5.

Referring to FIG. 5 a synchronous motor 500 is connected to a source of power such as 60 cycle alternating current power line. The synchronous motor is connected to a shaft 501, a gear box 502 and electrically actuated clutch 503 connected to a shaft 504 and electrically actuated brake 505 and shaft 506 mounted in bearings 507, 508 and 509. Shaft 506 which is connected to and disconnected from shafts 504 and 501 by means of the electric clutch 503, also includes a rotatable permanent magnet arm 510 which is rigidly attached to shaft 506 by means of a clamp 511. This arm has an adjustable polepiece 512 which is adjusted to produce a low reluctance path through a magnetic pickup circuit 513. The arm 510 and circuit 513 generate a pulse and impress it on a conductor 514 connected to the electronic programmer which controls the operation of clutch 503 and of brake 505 in such a manner so as to start and stop the rotation of shaft 506 for controlling the winding pattern produced on the ball. Shaft 506 also includes a cam 515 which is also shown in FIG. 6. This cam is attached to shaft 506 and revolves with the shaft.

Cam 515 is mechanically connected to a cam follower 516 and cam follower 516 is connected to a reciprocating arm 517. Arm 517 in turn is connected through a coupling 518 to a reciprocating rod 520 which controls the position of all ball-supporting beveled rollers 114, FIGS. 10, 11, 9 and 12–17 and in this manner controls the type of a single turn produced on the ball, such as turns 1 through 6 illustrated in FIG. 1. The eccentricity of cam 515 controls the magnitude of the angle $\alpha$ and the angle $\theta$ since angle $\theta$ is equal to the angle $\alpha$ multiplied by the number of complete turns used in a single winding cycle or period, i.e. $\theta = \alpha \cdot n$. As will be pointed out later, it is also possible to vary $\alpha$ and $\theta$ by an additional control means, other than cam 515, which will be described later after concluding the description of FIGS. 5 through 18.

Figure 7:
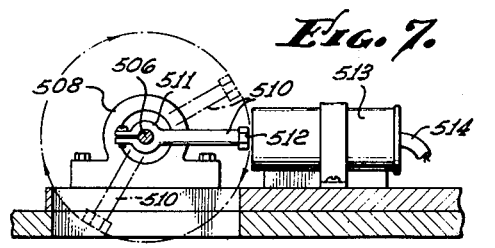
FIG. 7 is a side view of the revolutions pulse generator shown in FIG. 5.

The side views of cam 515 and of the mechanical arm 510 and of the pulse generator 513 is also illustrated in FIGS. 6 and 7. FIG. 7 also illustrates the direction of rotation of the mechanical arm 510. It is immaterial whether shaft 506 rotates clockwise or counter-clockwise.

The synchronous motor 500 is connected to the power line through an appropriate switch (not illustrated) and this switch remains closed as long as the winding machine is in operation. Therefore, motor 500 provides a constant speed drive for the reciprocating rod 212 which is thus reciprocated in synchronism with the remaining drive mechanisms of the machine. These additional drive mechanisms are also driven by the synchronous motors connected to the same source of A.C. power having a constant frequency. Accordingly, as long as the synchronous motors 500 and all other synchronous motors are connected to the constant frequency source, the programming of the program-cycle and of the complete cycle is determined by the signals delivered by the programmer to clutch 503 and brake 505.

The reciprocating rod 520 may control any number of individual ball winding units, the term "unit" being considered here as constituting a single station of the machine capable of winding a single ball. In the example illustrated in FIGS. 5 through 18, the reciprocating rod 520 controls 20 units, or stations, ten stations being arranged in a single row on one side of the rod and ten additional stations being arranged in the second row on the other side of rod 212, the two rows being in a back-to-back relationship with respect to each other with the reciprocating rod 212 being a common element for both rows.

Figure 8:
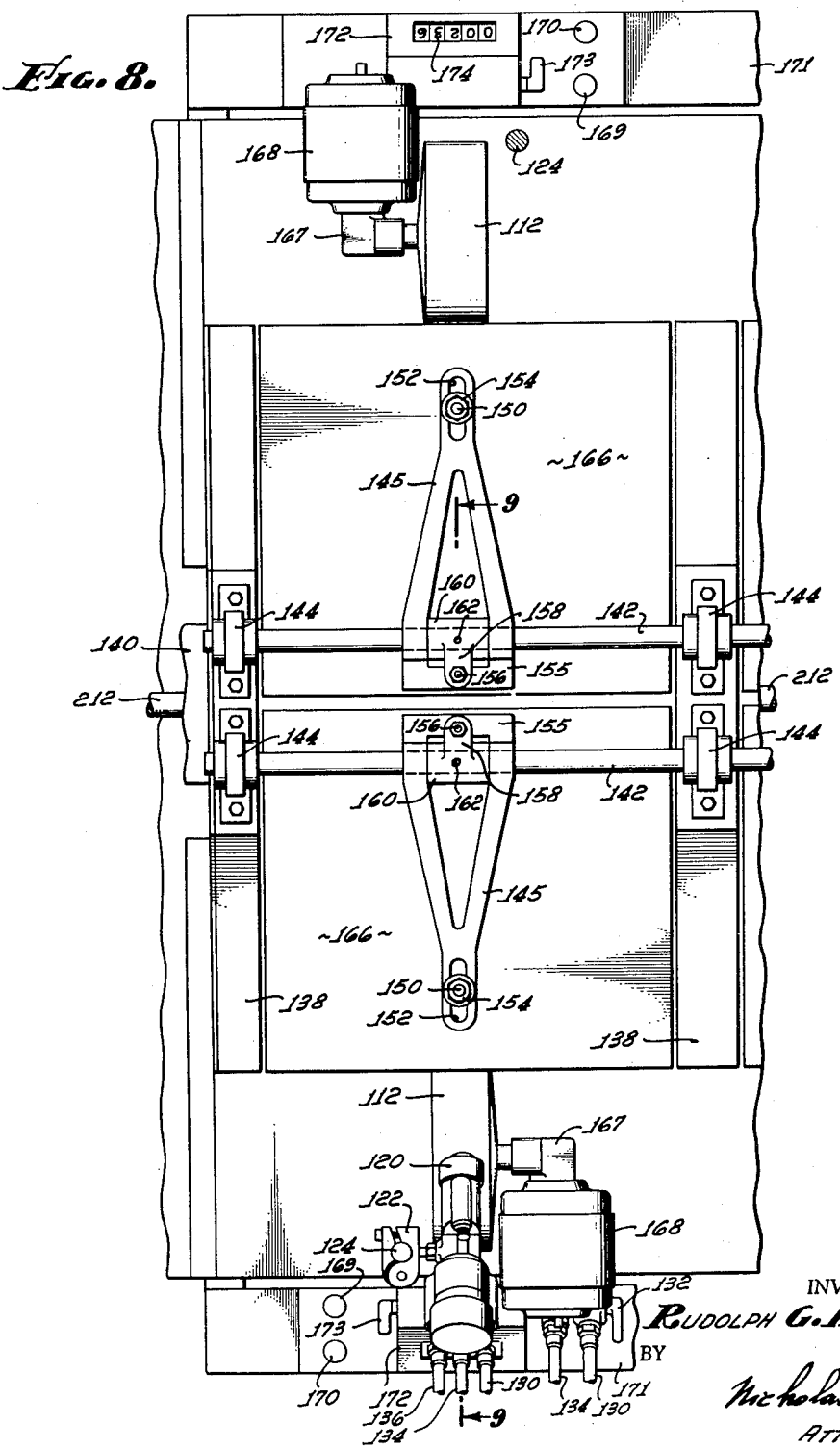
FIG. 8 is a plan view of two winding stations.
Figure 9:
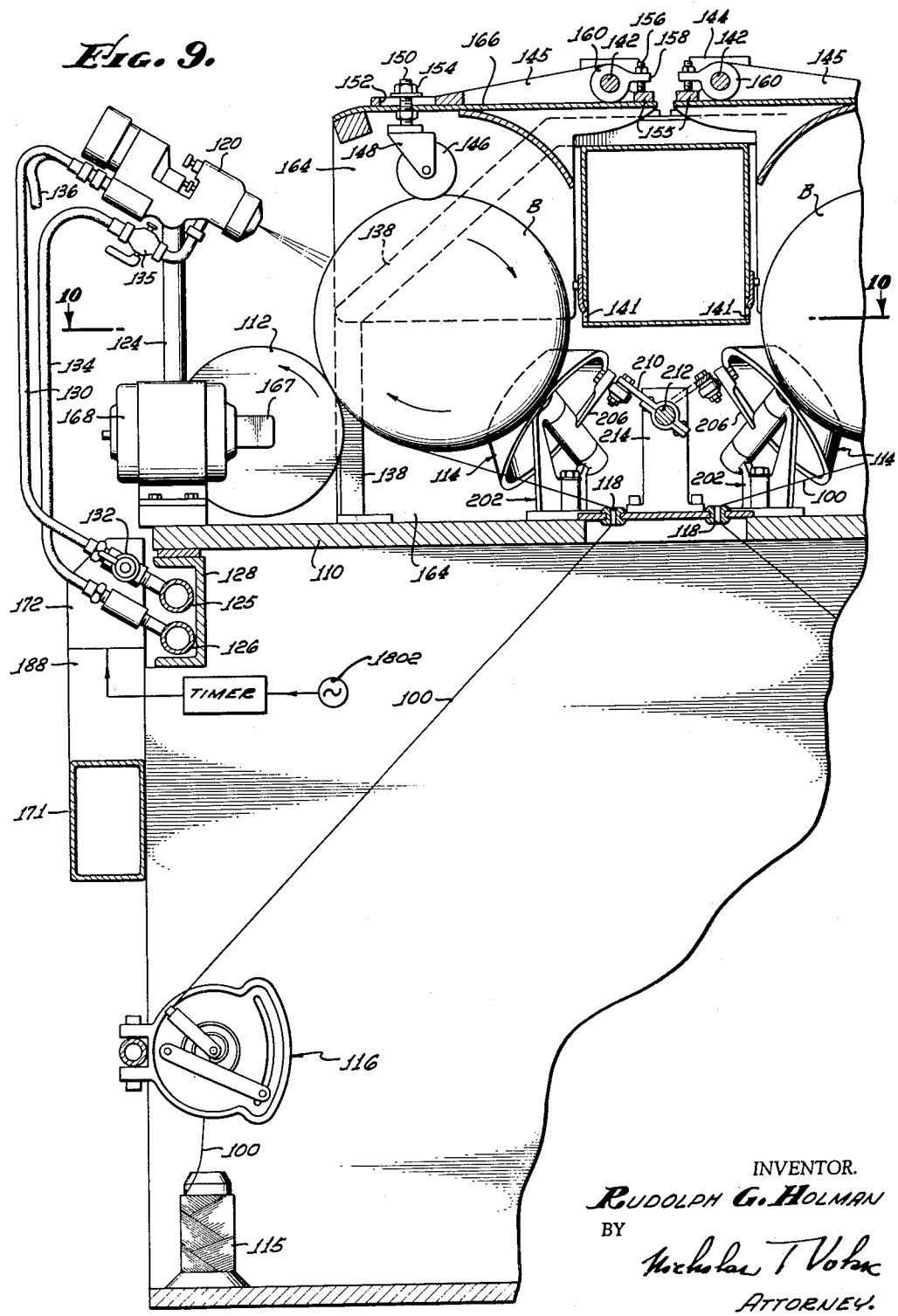
FIG. 9 is a vertical sectional view of the winding apparatus taken along line 9—9 shown in FIG. 8; this view being the view of the winding mechanism at one of the winding stations.

The plan views and the side-views of the two back-to-back stations of the above type is illustrated in FIGS. 8, 9 and 10. Referring to FIGS. 8 through 11 collectively, where the same elements bear the same numerals, the two rows of stations are mounted on two elevated coplanar platforms or base plates 110. Each of the winding stations has a drive roller 112 and two beveled idler rollers 114 which cooperate to provide a three-point seat for supporting a ball B. At each of the winding stations a thread 100 is supplied by a spool 115 and controlled by a well known type of automatic tensioning device 116. Thread 100 is led upward through a sleeved aperture 118 to the periphery of the ball as shown in FIG. 9. At each winding station an atomizer or spray head 120 is adjustably mounted by a jaw-type holder 122 on an upright support rod 124. The various spray heads are supplied by a compressed air supply pipe 125 and a liquid supply pipe 126 which are housed in a longitudinal channel 128 along each row of stations. Air from the supply pipe 125 is supplied to each of the spray heads 120 through a flexible hose 130 controlled by a valve 132 and a liquid cement from the supply pipe 126 is fed to the spray head through a hose 134 having a valve 135. A third hose 136 is connected to each spray head for remote control of the operation of the gun by air pressure. In the presently preferred practice of the invention the liquid supplied by pipe 126 is a coumaroneindene resin but other adhesive liquids can be used in various practices of the invention.

The two rows of winding stations are provided with an upright frame structure 138 mounted on the top 110. Frame 138 carries a central exhaust duct 140 for removing vapors released by the spray heads 120. This duct has an intake port 141 at each winding station. Mounted on top of the frame structure 138 is a pair of shafts 142 journaled in spaced bearings 144. Shafts 142 extend through the entire length of the machine. Rotatably mounted on these shafts 142 are a plurality of overhanging arms 145, there being one arm at each winding station to weight down ball B. Each of these overhead arms 145 carries a small pressure roller, or caster, 146 in a swivel bracket 148. The swivel bracket 148 has a shank 150 that extends through a longitudinal slot 152 in the overhead arm and is adjustably retained therein by a pair of nuts 154.

Each of the overhanging arms 145 is independently rotatable on the corresponding shaft 142 and may be individually and manually swung up and back to permit replacement of a ball at the winding station. If desired, however, all of the overhanging arms 145 on either of the two shafts 142 may be raised simultaneously by rotation of the shaft. For this purpose each of the overhanging arms 145 has a rearwardly extending flange 155 which normally rests against an adjustable screw 156 carried by a finger 158. The finger 158 is unitary with a sleeve 160 that is fixedly mounted on the corresponding shaft 142 by a set screw 162. It is apparent that rotation of a shaft 142 in a direction to depress the fingers 158 thereon will cause all of the overhanging arms 145 on the shaft to be rotated upward.

Each of the winding stations is partially enclosed by a suitable hood to cause the vapors released by the spraying operation to be confined and drawn off by the exhaust duct 140. The hood for each winding station includes two side walls 164, FIG. 10, a front wall 165 and a top cover 166 fastened to the overhanging arm 145.

All of the drive rollers 112 of the winding stations are connected through individual gear boxes 167 to the individual synchronous motors 168 which are connected to the same source of alternating current as motor 500 in FIG. 5. Motor 168 is manually operated by means of a "start" switch 169 and "stop" switch 170. This motor is also operated (stopped) by a counter 172 in the manner described below. A metallic gutter 171 is used for housing the wiring for the motors and counters 172, or timers, which are operated by the programming system. The programmer sends timing pulses into timer 172 which has a relay (not visible) mounted in timer 172. The programmer sends a pulse every 4.3 seconds, or some other suitable time interval, which operates the counter in the timer, the dial 173 of counter (see FIG. 8, top) counting the number of pulses received by the counter. After timer 172 (or counter) receives a predetermined number of pulses, it automatically shuts off motor 168 independent of the manually operated switches 169 and 170. The operator then removes the wound ball, inserts the new ball, having no winding, connects thread 100 to the surface of the new ball by manually winding several times, depresses the timer switch 173 which again starts the winding period of the next program cycle.

As best shown in FIG. 11, each of the beveled idler rollers 114 is mounted by means of a ball bearing 192 on a spindle 194 which is carried by an inclined sleeve 195. Inclined sleeve is fixedly held by a screw 196 on an inclined pivot pin 198 and the opposite ends of the pivot pin are journaled in suitable bearing bushings 200 in a bracket 202. Each of brackets 202 is mounted by a central screw 204 on the corresponding platform 110 and is secured against rotation on the platform by a suitable key or dowel 205.

Sleeve 195, that carries spindle 194, has a control arm 206 (FIGS. 9 and 10) for oscillation of the idler roller 114 about the axis of inclined pivot pin 198. As best shown in FIG. 10, the two control arms 206 of the two idler rollers 114 at each winding station are connected by a pair of corresponding links 208 to an angular bracket 210. All of the angular brackets 210 of the two rows of winding stations are fixedly mounted on the longitudinally reciprocative rod 212 (see also FIG. 5 for rod 212) that is slidingly mounted in suitable bearings 214. Rod 212 is reciprocated longitudinally by cam 515, as described previously, to cause simultaneous oscillation of all of the idler rollers 114 of the two rows of the winding stations.

As may be seen in FIG. 10, the two beveled idler rollers 114 at each winding station are relatively close together with their beveled surfaces being tangential to ball B. As may be seen in FIG. 9, the axis of the drive roller 112 at each winding station is positioned in a direction approximately 45° downward from the horizontal plane passing through the center of ball B. The axis of oscillation 177 (see FIG. 11) of each of the idler rollers 114 i.e., the axis of the inclined pivot pin 178, passes through the point of tangential contact of the beveled idler roller with the periphery of ball B and intersects the center of the ball at an angle of 45° downward from the horizontal plane passing through the center of the ball.

Figure 12:
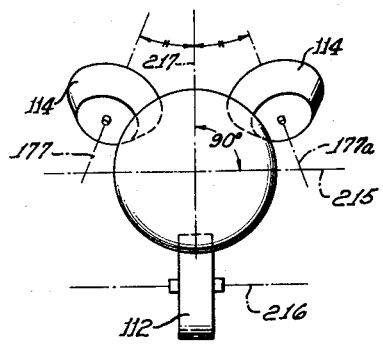
FIG. 12 is a simplified plan view of the winding mechanism at a winding station of the apparatus, the mechanism being shown at one stage of the winding operation.
Figure 13:
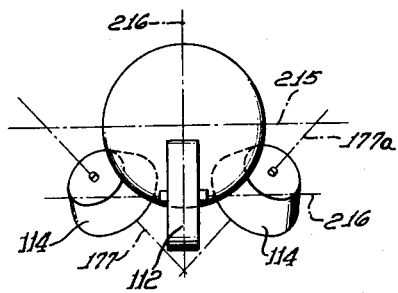
FIG. 13 is an end elevation of the structure shown in FIG. 12.
Figure 14:
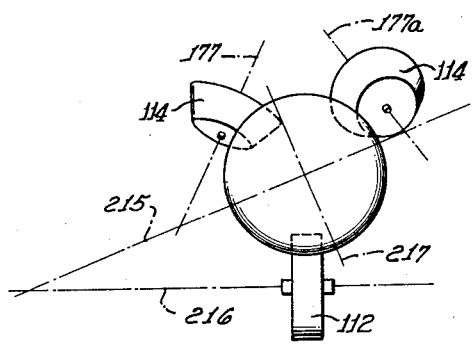
FIG. 14 is a plan view similar to FIG. 12 at another stage in the winding period.
Figure 15:
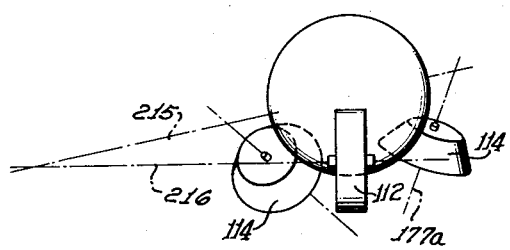
FIG. 15 is an end elevation of the structure shown in FIG. 14.
Figure 16:
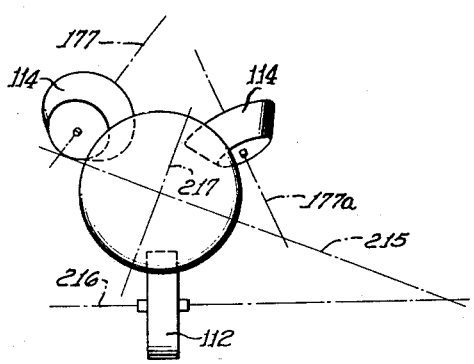
FIG. 16 is a plan view similar to FIGURES 12 and 14 showing the winding mechanism at still another stage of the winding period.
Figure 17:
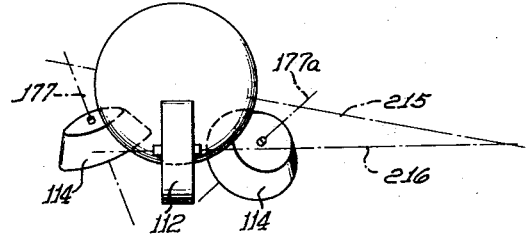
FIG. 17 is an end elevation of the structure shown in FIG. 16.

The oscillating action of the two beveled idler rollers 114 and their effect on the rotation of the ball B may be understood by reference to FIGS. 12 through 17. Roller 146 is omitted in FIGS. 12–17. FIGS. 12 and 13 show both of the idler rollers 114 at their mid-points of oscillation; FIGS. 14 and 15 show the two idler rollers at one extreme of their range of oscillation; and FIGS. 16 and 17 show the two idler rollers at the other extreme of their range of oscillation. The axis of rotation of ball B is indicated by the broken line 215. In FIGS. 12 and 13, this axis 215 is parallel with the axis of rotation 216 of the drive roller 112. The axis 215 of the ball oscillates in the plane passing through the axis 216 and, except for the momentary transitory position of the axis shown in FIG. 12, axis 215 intersects axis 216 as shown in FIGS. 14 through 17. The two axes of rotation 177 of the two idler rollers 114 oscillate in the plane of the axis 215 of ball B and constantly intersect axis 215. The two idler rollers 114 make one complete oscillation about their axes 177 and 177a, from the position shown in FIG. 12 to that in FIG. 14, then back to the position shown in FIG. 12, then to the position shown in FIG. 16 and back to the position shown in FIG. 12 during one revolution of the ball in the illustrated program cycle. Therefore, the synchronous motors 500 and 168 are geared down so as to produce one complete revolution of shaft 506 and of cam 515 by motor 500 while motor 168 and drive roller 112 produce one revolution of ball B. If the relationship of the speed of ball to the speed of complete oscillation of the push-rod 212 and cam 515 is as indicated above, then the angular positions of the respective turns 1 through 6 will be of the type illustrated in FIGS. 1 and 2. If the direction of the angular shift of each point of the curve followed by the thread is examined in the plan view indicated in FIGS. 1 and 2, one can see that there is a continuous angular shift of the winding in the counter-clockwise direction from turn 1 to turn 6, this counter-clockwise shift taking place around the pole P in FIG. 1 and the poles P and $P_1$ in FIG. 2. This counter-clockwise shift also applies to the half turns on the other side of the ball, which are illustrated by a series of dotted lines. Such continuous counter-clockwise shift takes place even though rod 212, obviously, has a strictly reciprocating motion because as rod 212 moves in one direction, ball B travels 180° and, therefore, when rod 212 begins to move in the opposite direction, it engages the opposite hemisphere of the ball with the net result that in so far as the position of the turns on the ball is concerned, they constantly shift in the counter-clockwise direction, when viewed in FIG. 1, around pole P.

The above is discussed more in detail below in connection with FIGS. 20, 21 and 22.

Figure 20:
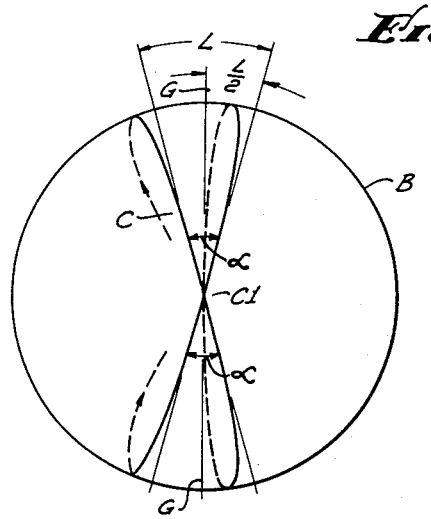
FIG. 20 is an explanatory figure showing plan view of the ball with two turns and the relationship of these two turns with respect to the great circle.
Figure 21:
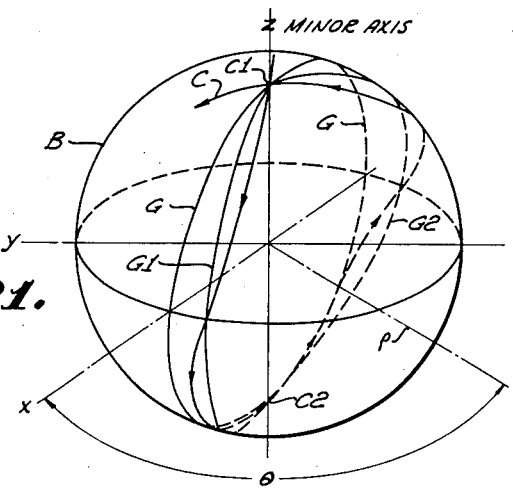
FIG. 21 is an explanatory figure showing a perspective view of FIG. 20.

In accordance with the invention, the free rollers 114, shown in the drawings, will wind the cord, or length of stranded material, on the ball on a curve indicated at curve C in FIGS. 20 and 21 on the ball B. Only a little more than one winding turn is shown for clarity. The turn has been dotted on the side of the ball which cannot be seen in view of FIG. 20. It is to be noted that the curve C crosses itself on the side which can be seen. On the side that cannot be seen, it is tangent to a great circle G. This same great circle G bisects the angle between its own cross-over point. The same is shown in FIG. 21. From the curves shown in FIGS. 20 and 21, it can be seen that curve C permits winding a ball with turns of a cord nearly on great circles, but with a very small deviation so that an angle α is produced at crossovers, for example, at the point C1 shown in FIG. 20. It can be shown how close the curve of the present invention comes to a great circle by analyzing the curve with mathematical equations.

The harmonic motion of free rollers 114 produces a curve C because, as mentioned previously, during each succeeding half cycle, the ball B is laterally rotated in opposite directions about a minor axis z perpendicular to the plane through the axis of drive roller 112 and the center of the ball. However, the fact, that this lateral rotation of the ball is synchronized with half cycles of the ball about the rotational axis 215, means that the ball is, in fact, laterally turned in the same direction constantly about an axis through the winding poles C1 and C2 shown in FIGS. 20 and 21. This means that several turns, such as those indicated in FIG. 1, may be wound on winding poles in positions for maximum supporting strength before the symmetry is upset by some other mechanism, such as, for example, by arresting the oscillation of rollers 114 for a certain pause, as is actually done.

It is to be noted at this point that the resultant rotation of the ball is only in one direction about one axis. However, for purposes of analysis, the angular velocity of the ball can be, and preferably is, resolved vectorially into two components. One component about the axis z in FIG. 21 and one component about an axis y shown in FIG. 21. Although the speed of the ball about the minor axis shown in FIG. 21 may approximate simple harmonic motion, this is not necessarily true. At least, it is obvious that the first harmonic of this motion will be rather large in comparison to any subsequent harmonic.

Figure 22:
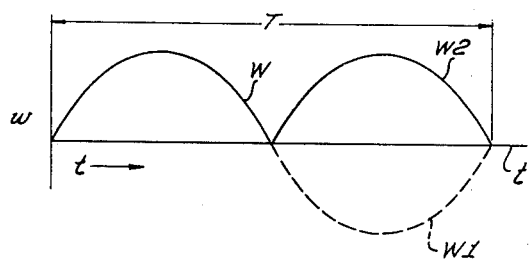
FIG. 22 is a graph of a function illustrating a change in speed of rotation of the ball about the z-axis as it is wound on the apparatus of the invention.

Normally, the speed of the ball about the minor axis, which may be called $w$, may be represented as a function of time, $t$, as indicated in FIG. 22. Normally, for simple harmonic motion, a waveform $w$ would be sinusoidal and drop below the absyssa, $t$, as indicated in dotted lines at $W_1$. However, since the ball is rotated synchronously with free rollers 114, the ball actually rotates in the same direction and follows the curve $W_2$ during the second half of the period of this sinusoidal function. It is to be noted that rectangular coordinates $x$, $y$ and $z$ may be expressed in cylindrical coordinates $\rho$, $\theta$ and $z$ as shown in FIG. 21.

Thus an axis $y$, as shown in FIG. 21, may be called the major axis of rotation of the ball B. The curve $w$, although it may not be exactly sinusoidal, will be rather close to the function $$w = \frac{\pi \alpha}{T} \sin \frac{2\pi t}{T} \quad (1)$$

where $\pi$ is 3.1416 and $\alpha$ is equal to the angle $$\frac{2}{L}$$

shown in FIG. 20.

Based on the assumption of Equation 1, which will reasonably approximate the true function for the conditions stated, the equations for the curve in cylindrical coordinates $\rho$, $\theta$ and $z$ may be developed very simply in terms of the time parameter $t$ as follows:

$$\rho = r \sin \frac{2\pi t}{T} \quad (2)$$

$$\theta = \frac{\alpha}{2}\left(1 - \cos \frac{2\pi t}{T}\right) \quad (3)$$

$$z = r \cos \frac{2\pi t}{T} \quad (4)$$

where $r$ is the radius of the ball B as shown in FIG. 21.

In order to wind the ball so that the cord will not be wound off of the ball, it is very desirable that an angle of 15° previously mentioned be maintained. However, to show how very nearly to a great circle the winding curve C is, as shown in FIGS. 20 and 21, and defined approximately in terms of Equations 2, 3 and 4, the length of arc of one complete revolution of the ball should be nearly equal to $2\pi r$, the circumference of the ball B. To illustrate the deviation, the length of an arc is computed for several different crossover angles $\alpha$.

By definition, the length of arc S is given by the following equation:

$$S = \int_{t_1}^{t_2}\left[\left(\frac{\partial z}{\partial t}\right)^2 + R^2\left(\frac{\partial R}{\partial t}\right)^2 + \left(\frac{\partial R}{\partial t}\right)^2\right]^{1/2} dt \quad (5)$$

Using Equations 2, 3, 4 and 5, the integral from $t_1$ to $t_2$ may be replaced by four times the integral from the limits 0 to $$\frac{T}{2}$$

Hence, $$S = 2r \int_0^{\pi/2} (\alpha^2 \sin 4\gamma + 4)^{1/2} d\gamma \quad (6)$$

where $$\gamma = \frac{2\pi t}{T}$$

By approximate numerical integration using $\alpha = .8$ radians, i.e., $\alpha = 45°$ and a crossover of 90°, on a very conservative basis of $$S = \pi r(\alpha^2 + 4)^{\frac{1}{2}} \quad (7)$$

$$S < 2.16\pi r \quad (8)$$

Therefore the deviation will be $$\frac{S - 2\pi r}{2\pi r} < 8.0\% \quad (9)$$

The percent elongation of arc reduces exponentially with $\alpha$. For example, if $2\alpha = 45°$ and $\alpha = .14$ radians, then Equation 10 is:

$$\frac{S - 2\pi r}{2\pi 4} < 2.0\% \quad (10)$$

at a crossover of 12° or $\alpha = 6°$, the present elongation of arc is:

$$\frac{S - 2\pi r}{2\pi r} < 0.13\% \quad (11)$$

By performing numerical integration, the above percentages may be reduced substantially, e.g., by a factor of 2.

From the foregoing, it will be appreciated that both the plurality of sets of turns over several sets of spaced diametrically opposed pairs of winding poles, due to the very uniform winding on the ball B. Still further, the use of the particular curve securely retains the ball and fully utilizes the strength of the cord by approximating great circles in a manner such that the smooth curve C is very close to a great circle and deviates by an amount which is representative by an increase in percentage elongation from a great circle as calculated approximately above.

It is to be noted that great semi-circles G1 and G2, as illustrated in FIG. 21, will appear as straight lines separating the dotted and solid portions of the curve C in the upper and lower half of the ball B shown in FIG. 20.

Of course, cylindrical coordinates $\rho$, $\theta$ and $z$ may be given in terms of each other rather than the parameter $t$ as follows:

The curve on the ball B may be expressed as the intersection of a leaved cylinder and a sphere, respectively, as follows:

$$\rho = \frac{2r}{\alpha}(\alpha\theta - \theta^2)^{1/2} \quad (12)$$

$$\rho^2 + z^2 = r^2 \quad (13)$$

Alternatively, the curved line may be defined as the intersection of the spiral sheet as follows:

$$z = \frac{r}{\alpha}(\alpha - 2\theta) \tag{14}$$

and either the sphere of Equation 13 or the leaved cylinder of Equation 12. It is to be noted that in the algebraic equations for the curve C will be valid for only succeeding half cycles be cause the algebraic sign of $w$ remains constant as indicated in FIG. 22.

ELECTRONIC PROGRAMMER FOR CONTROLLING THE BALL-WINDING MACHINE

Figure 19:
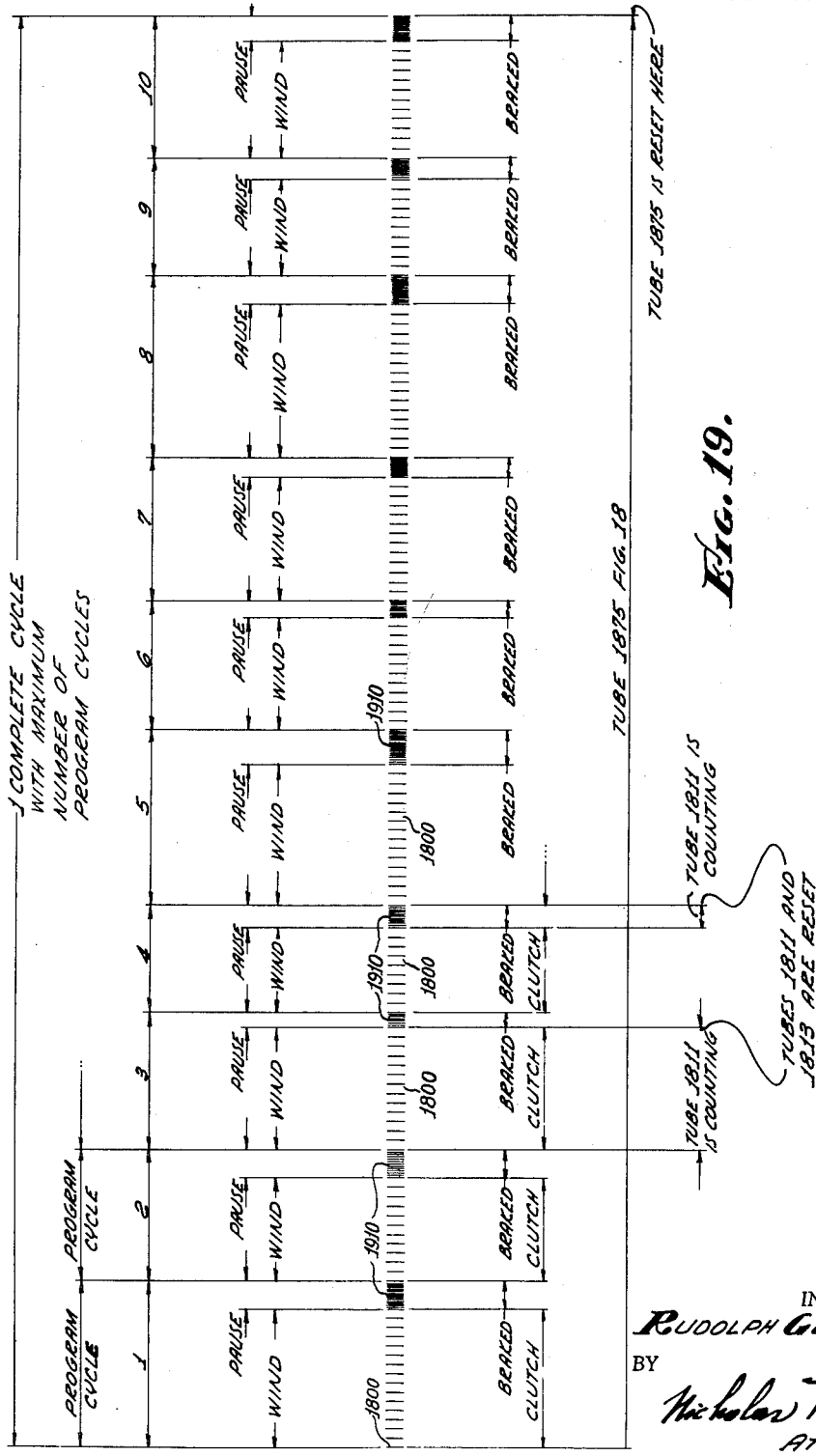
FIG. 19 is an explanatory diagram illustrating program cycles and a complete cycle plotted against time-axis.

As has been described already in the introductory part of the specification, the program cycle includes a "wind period" and a "pause period." These periods follow each other and are illustrated in FIG. 19 for ten consecutive program cycles. It also has been mentioned previously that it is possible to vary the duration of the winding period as well as the duration of the pause period in each program cycle. The above is illustrated diagrametrically in FIG. 19 where the program cycles are plotted along a time axis. There are ten program cycles in FIG. 19 and these ten cycles make up one complete cycle.

The duration of the wind period is determined by allowing only a predetermined number of the wind timing pulses 1800 to go through the wind switch. This will become more apparent from the description of the block diagram, FIG. 18 of the programmer. Pulses 1800 are the pulses which are generated by the revolving magnet arm 510 and the magnetic pick-up circuit 513 and, therefore, are the pulses which determine the number of complete reciprocations performed by rod 212 and rollers 114. The timing pulses 1910 for the pause period are obtained from the 60-cycle power line by rectifying them and then obtaining 120 pulses per second timing signal which is used for operating the programmer during the pause period. Since the repetition rate of the 120 pulses per second is much higher than of the wind pulses 1800, they are more closely spaced in FIG. 19 than the wind pulses 1800. Accordingly the duration of the wind period and of the pause period in each program cycle depends on the number of pulses 1800 and 1910 allowed to get through the programmer during these two periods. As shown in FIG. 19, any desired combination of the pulses 1800 and 1910, within the limitations imposed by the wind and pause switches, can be programmed into the programmer for producing a complete cycle.

The maximum number of the program cycles that may be included in one complete cycle depends on the total number of the program cycle switches that are made available on the front panel of the programmer, on the number of the cathode positions in the glow transfer tubes and also on the number of the positions available on the programming switch. The number of the positions on the programming switch is always equal to the maximum number of the program cycles available for completing one complete cycle. Since each program cycle requires a wind switch and a pause switch (two switches), it follows that a complete cycle, which includes ten program cycles, will have a programming switch having ten positions and it will have ten selector switches for ten wind cycles, or periods, and ten selector switches for ten pause periods. Therefore, the complete cycle composed of ten program cycles will require twenty one switches, altogether.

In the above example, where the complete cycle may include ten program cycles, the program selector switch permits one to include any desired number of the program cycles, from one to ten, which means that either the first program cycle can be repeated continuously for completing the entire winding of the ball or any number— from 1 to 10—of additional, individual program cycles may be included in the complete cycle.

The programmer is so organized that it is possible to select the program cycles by means of the programming switch in the following series:

(a) Program cycle 1 which repeats itself continuously;
(b) repeated program cycles 1 and 2;
(c) repeated program cycles 1, 2 and 3;
(d) repeated cycles 1, 2, 3, 4, etc. up to cycles 1 through 10.

The above will become more apparent from the description of the block diagram, FIG. 18, the description of which is given below.

Referring to FIG. 18, it illustrates an abridged block diagram of the entire programmer. The programmer is controlled by two input signals. The first input signal is signal 1800 which is produced by the revolving magnetic arm 510 and the magnetic pickup 513 connected to a pulse generating circuit 1801. Devices of the above type are well known in the art and, as a rule, consist of a magnetic core with the primary and secondary windings wound upon this core. The primary is connected to a source of alternating current potential 1802 and the secondary winding is connected to a thyratron phase detector 1801, which is also connected to the alternating current source 1802. The parameters of the primary and secondary circuits are so arranged that the two circuits are in phase opposition with respect to each other when arm 510 is not in the proximity of the magnetic pickup 513. When the ferro-magnetic arm 510 is in the proximity of the magnetic pickup 513, the phase relationship of the primary and secondary circuits is altered to a sufficient extent so as to produce a high amplitude positive signal on the control grid of the thyratron in the phase detector circuit 1801.

The thyratron becomes conductive only for a very short interval of time corresponding to the duration of the positive portion of the alternating signals and it is then rendered non-conductive by the removal of the plate potential on the plate of the thyratron by the ringing circuit connected in the plate of the thyratron. The resulting positive signal is signal 1800 which occurs once for each revolution of shaft 506. In the example selected for the description of the overall system, it has been assumed that the two synchronous motors 500 and 168, the gear boxes 502 and 167, as well as the dimensions of the drive wheel 112 are so proportioned as to produce one complete turn such as turn 1 in FIG. 1 of thread 100 on ball B for each pulse 1800. Therefore, since pulse 1800 is produced by the pulse generator 1801 for each turn of shaft 506, shaft 506 makes one revolution for each complete turn of thread 100 on ball B. As stated previously, this ratio need not be 1:1 ratio; the 1:1.003, for example, is recommended for spreading the pole intersection.

FIGURE 1 illustrates that during one program cycle 6 complete turns are wound on the ball whereupon the winding period is followed by the pause period which is produced by disconnecting clutch 503 and applying brake 505 to shaft 506. It is also necessary to have a timing signal for controlling the pause period. The timing signal for the pause period is obtained by connecting the 60 cycle source 1802 to a full wave rectifier 1803 and then impressing the output of the rectifier on and "and" gate circuit 1804. The "and" gates 1804 and 1805 are controlled by the clutch signal appearing on conductors 1806 and 1807 and by the brake signal appearing on conductors 1808 and 1809. The control of the gates 1804 and 1805 is such that when the wind signal passes through gate 1805 the timing signal from rectifier 1803 is blocked and vice versa.

The gates 1804 and 1805 are connected to a "step" amplifier 1810 whose output is connected to the guide pins of a bi-directional glow transfer tube 1811 which has ten stable state cathodes 0 through 9 and two glow transfer pins posted between each cathode. Tube 1811 may be considered as a decimal counting tube for counting the pulses impressed on the guide pins, and, after counting ten pulses, it returns to its original zero position after delivering a pulse to a step amplifier 1812 which is connected to a bi-directional glow transfer tube 1813. This tube is identical to tube 1811; it has ten cathodes 0 through 9 so that it is capable of counting every 10th pulse 1800 or every 10th pulse 1910, depending upon the state of the gates 1805 and 1804.

The cathodes 1814 of tube 1811 are connected in parallel to the "units" contacts of the pause switches 1820 through 1829 and also to the "units" contacts of the wind switches 1830 through 1839. The cathodes of tube 1813 are also connected to the wind and pause switches 1820 through 1839, but in this case the cathodes are connected to the "tens" contacts of the switches. These connections are omitted in the block diagram for its simplification, but are illustrated, in parts, in the schematic diagrams and will be described more in detail later.

The outputs of the wind and pause switches 1820 through 1839 are connected to the three-legged "and" gates 1840 through 1859. The outputs of the gates 1840 through 1949 are buffered together to a common conductor 1860 which receives signals from one of the gates 1840 through 1849 at any given instant. Conductor 1860 is connected over a conductor 1869 to an amplifier 1868 and the output of amplifier 1868 is connected over a conductor 1870 to a thyratron flip flop circuit 1864. The output of the thyratron flip flop circuit 1864 is connected to the brake winding 1865 and to the clutch winding 1871 which are the control windings of the brake 504 and clutch 503 illustrated in FIG. 5. The gates 1850 through 1859 are buffered to a common conductor 1867 which is connected to an amplifier 1862 through a conductor 1861.

The outputs of the three-legged "and" gates 1840 through 1859 are controlled by the two signals produced by pause switches 1820 through 1829 and the wind switches 1830 through 1839 which are connected to the cathodes of the "units" and "tens" tubes 1811 and 1813. The third signal is impressed on the third leg conductors 1880 through 1889 by the cathodes of the program selector tube 1875.

Therefore, the gates 1840—1859, in addition, are also controlled by the program tube 1875 which is identical to the tubes 1811 and 1813. The tens cathodes of tube 1875 are connected directly to the conductors 1880 through 1899. These connections are not illustrated in the block diagram but will be described here as follows: cathode 1 is connected to conductors 1880 and 1890; cathode 2 is connected to conductors 1881 and 1891 etc.

The function performed by the program cycle switch 1900 is to select the number of the individual program cycles to be used in the complete cycle. In order to achieve this, the outputs of the gates 1850 through 1859 are connected to the program switch 1900 which has ten positions. Slider 1901 may be shifted to any one of the ten positions. Slider 1901 is connected to an amplifier 1902 and the output of amplifier 1902 is connected through a conductor 1903 to a cathode 1 of tube 1875. When slider 1901, for example, is positioned on contact 6 of switch 1900, gate 1856 delivers a control pulse to amplifier 1902 and this pulse is impressed on cathode 1 of the program cycle tube 1875, thus resetting this tube back to its reset cathode. Such resetting of the program cycle tube 1875 returns the complete cycle back to the gates 1840 and 1850 which control the timing of the first program cycle. Therefore, depending on the setting of the program cycle switch 1900, the complete cycle may have from one to ten program cycles in the complete cycle which repeat themselves until the winding of the ball is completed and the synchronous motor 17 is stopped by the counter.

Amplifier 1902, whose output is connected through conductor 1903 to the first cathode of tube 1975, is the reset amplifier which returns tube 1875 to its reset position, i.e. cathode 1.

It is also necessary to provide the stepping signal for tube 1875 at the conclusion of each program cycle. This signal is produced by the first thyratron in the flip flop thyratron circuit 1864 whose output is connected in series with the brake winding 1865. Therefore the stepping signal for tube 1875 is produced at the same time the brake signal is impressed on the brake winding 1865 which takes place at the conclusion of each wind cycle, or wind period. In this manner tube 1875 is stepped from one cathode to the next upon the conclusion of the winding cycle.

Only a brief description of one complete operating cycle will be given in connection with the block diagram because a more detailed description is given in the divisional application S.N. 62,293, filed October 12, 1960, where it is given upon the completion of the description of the schematic diagrams. The source of alternating power 1802 produces two input signals, one signal is the previously mentioned series of uniformly spaced pulses 1800 which represent the revolutions of shaft 506, one pulse for one complete revolution of shaft 506 being generated by the magnetic pick-up 513 in the manner described previously. The same A.C. source 1802 also produces pulses 1910 which comprise the rectified version of the 60 cycle frequency of source 1802. The fully rectified wave is inverted and the top half of the signal is used as a means for timing the pause period and also for adjusting its duration by means of the pause switches 1820 through 1829. Since the system should respond only to the shaft input signal 1800 during the wind period of the program cycle, it is necessary to interpose the "and" gates 1805 and 1804 whose function is to impress signal 1800 on the step amplifier 1810 during the wind period and block the 120 cycle signal 1910.

This is accomplished by connecting the gates 1805 and 1804 to the output of the thyratrons 1864, the clutch thyratron being rendered conductive during the wind period and the brake thyratron being rendered conductive during the pause period. These thyratrons furnish the necessary signals to the gates 1805 and 1804 so that only one type of signal is impressed on amplifier 1810 at any given time. It should be mentioned here if only parenthetically, that strictly speaking it is necessary to gate only gate 1804 rather than both gates because when the brake signal is impressed on the brake winding 1865 and the flow of current through the clutch winding is simultaneously stopped, shaft 506 is immediately stopped and the generation of signal 1800 by means of the revolving arm 510 is also stopped at the same time.

If the description of the program cycle is to begin with the assumption that the cycle begins with the winding period of the cycle, then signals 1800 are impressed on the guide pins of tube 1811 whose cathodes 1814 are connected to the switches 1820 through 1859. It may be remembered that cathode 1 of tube 1811 is connected in parallel to the pause switch 1820 and the wind switch 1830, switches 1820 through 1829 being the pause switches which are used for adjusting the length of the pause period and switches 1830 through 1839 being the wind switches for adjusting the number of turns produced during any given program cycle.

Before proceeding with any further description of the functional cycle of FIG. 18 it should be mentioned here that it will be assumed that the program cycle tube 1875 is set on cathode 1 and therefore the circuit is sensing the wind gate 1850. It will be assumed also that the program cycle switch 1900 and its slider arm 1901 are set on position 10 with the result that the complete cycle will include ten wind periods and ten pause periods. Therefore, the operation of the programmer will include the operation of all the pause switches 1820 through 1829, all the pause gates 1840 through 1849, all ten wind switches 1830 through 1839 and all the wind gates 1850 through 1859.

The first pulse 1800 reaching tube 1811 steps it from cathode zero to cathode 1 with the result that a pulse is impressed by cathode 1 of tube 1811 on "position 11" (see FIG. 20, switch 1820, conductor U1, and contact 11) of the ten wind and the ten pause switches. These connections will be described in more detail in connection with the description of FIG. 20 and pause switch 1820 illustrated more in detail in FIG. 20 and therefore it will be stated here only briefly that a signal is transmitted by only one "and" gate 1840 through 1859 at any given instant only when three signals appear simultaneously on the three input leads connected to the input side of each gate circuit. Since the "and" gates are three-legged gates, they require three co-phased signals for producing an output signal in their output.

These three gate signals are impressed on these gates by the three tubes 1811 and 1813 and 1875 in the manner described below. It has been already mentioned how cathode 1 of tube 1811 impresses its signal on one specific contact of all the pause and all the wind switches. If switch 1820 is set on position 11, two of the input conductors of gate 1840 are directly connected to the cathodes "1" of the transfer tubes 1811 and 1813. Since tube 1811 is a "units" tube and tube 1813 is the "tens" tube, i.e. tube 1811 responds to each pulse and tube 1813 responds to each tenth pulse, these two tubes will deliver a pulse to switch 1820 at the same time only when eleven pulses have been counted and cathodes 1 of tube 1811 and cathode 1 of tube 1813 are energized.

Also, in order to obtain a signal in the output of gate 1840, it is also necessary to obtain an output signal from cathode 1 of tube 1875. Since the block diagram does not indicate the actual connections of the switches but these connections are shown in FIGS. 19 through 21 of the divisional application, the detailed description of the switch connections is given in connection with the description of the schematic diagrams illustrated in the divisional application. Suffice to say that when the program cycle switch is set on position 1, and the switches 1820 through 1839 are set in any position from two through 20, it will be possible to obtain one output signal, or pulse, in the gate circuit and conductor 1869 upon the completion of the wind period. This pulse is impressed on the grid of the thyratron which is connected in series with the brake winding 1865, thus energizing this thyratron and de-energizing the clutch thyratron which supplies current to the clutch winding 1871. Accordingly, the clutch winding 1871 will be de-energized, the brake winding 1865 will be energized, rotation of shaft 506 will be stopped by brake 505 and the wind portion of the first program cycle will be completed and it will be immediately followed by the pause portion of the cycle.

The reversal of the positions, or of the conductivities, of the thyratrons 1865 produces the required gating signals which are impressed through conductors 1809 and 1807 on the "and" gates 1805 and 1804 with the result that amplifier 1810 will now receive the 120 pulses per second signal 1910 from the full wave rectifier 1803. The control of the entire programmer at this time, during the pause period, will be governed by the pause signals 1910 and the setting of the pause switches, the position of the switches determining the number of the pulses which will be required for restoring the state of the conductivity of the flip flop thyratron circuit 1864 to its original state. The pause switches have from two to 20 positions and therefore the number of the 120 cycle pulses which will be required for operating the flip flop circuit may be manually varied from two pulses to twenty pulses.

Accordingly, the length of the pause period may be varied from 1/60 of a second to 1/6 of a second. Similarly the wind switches also have position settings from two to 20 and therefore the wind cycle may be set so as to produce from two turns per program cycle to a maximum of 20 turns for each program cycle. It is assumed here, as before, that one complete turn is produced on ball B for each pulse 1800.

The only remaining part of the block diagram that needs to be described here for completing the description is switch 1900 and the program cycle tube 1875 whose cathodes are connected to the third conductors of the "and" circuits 1840 through 1859. Depending upon the setting of switch 1900, which has ten positions, or contacts, either one or one through ten program cycles are included in the complete cycle. Accordingly, this switch enables one to vary the number of the program cycles included in one complete cycle. This is accomplished by setting the slider 1901 to any one of the ten contacts, which selects that cathode of the program cycle tube 1875 which delivers the reset pulse to tube 1875. For example, in FIG. 18, slider 1901 is positioned on contact 7. Therefore, only gate 1856 can produce a pulse which will get through switch 1900, contact 7, slider 1901, amplifier 1902 conductor 1903 and cathode 1 of tube 1875. When a negative pulse is impressed on cathode 1 in the above manner, the ionization is transferred directly from cathode 7 to cathode 1 and the next complete cycle, with seven program cycles, will begin to repeat itself indefinitely as long as the synchronous motor 168 remains connected to the 60 cycle source. As mentioned previously, motor 168 is controlled by the counter 172 which is operated by a timer also connected to the same 60 cycle source. When counter 172 receives a predetermined number of pulses, it disconnects motor 172 from the 60 cycle source and the winding station comes to rest. This indicates to an operator that the ball has been wound and should be replaced with the next ball.

For a more detailed description of the programmer, reference is made to the previously mentioned application S.N. 62,293, filed October 12, 1960.

What is claimed as new is:

1. The method of winding a thread on a ball for producing a ball winding, said method including the steps of winding a thread on the ball during a wind period of a program cycle having the wind period and a pause period, forming a number of turns approximating great circles during said wind period with the successive turns being angularly displaced in one direction by respective angle α formed by adjacent successive turns at the two regions of their intersections, said regions forming two diametrically opposed polar regions on said ball; shifting the two polar regions of intersection along an arc, positioned on the surface of said ball, after completion of the wind period and during said pause period; starting a succeeding program cycle after said pause period, selecting a predetermined number of program cycles for obtaining a complete cycle, and repeating said complete cycle for a predetermined period of time for completing said winding as a uniform layer of said thread covering the entire surface of said ball.

2. The method as defined in claim 1 which includes the step of adjusting the number of turns wound during each program cycle to any desired number between 1 and 99.

3. The method as defined in claim 1 which includes the additional step of including a plurality of said program cycles in said complete cycle, and repeating said complete cycle a plurality of times until the last complete cycle, the duration of the last complete cycle being determined solely by said predetermined period of time.

4. The method as defined in claim 1 which includes the step of including only one program cycle in said complete cycle, and repeating said program cycle for said period of time.

5. The method as defined in claim 1 which includes the step of making the number of turns, $n$, wound during each program cycle equal to each other.

6. The method as defined in claim 1 which includes the step of selecting the duration of the wind period in the respective program cycles included in the complete cycle, and selecting the duration of each pause period included in said complete cycle.

7. The method as defined in claim 1 which includes the step of varying the locus of each polar region from that approaching a geometric point to that of an arc defined by and passing through a plurality of intersections between the respective successive and preceding turns.

8. The method of winding a thread on a ball for producing a ball winding, said method including the steps of manually attaching said thread to the surface of said ball, placing said ball on first, second and third rotatable surfaces holding said ball in engagement with said three surfaces by means of a fourth rotatable surface by exerting a pressure on said ball with the aid of said fourth surface, all of said four surfaces forming a tangential contact with the outer surface of said ball, rotating said ball by means of said third surface at constant peripheral velocity during a wind period of a program cycle, said program cycle including said wind period and a pause period, synchronously oscillating the axes of rotation of said first and second rotatable surfaces during said wind period to cause the ball also to rotate about an oscillated axis, electrically synchronizing the cycle of oscillation of said oscillated axis with one revolution of said ball to cause said thread to follow a continuous path in which individual turns follow a path which passes through two polar regions with each turn approaching a great circle, electronically controlling the duration of each wind period by producing an electrical pulse for each complete turn of said thread, stopping the oscillation of the axis of rotation of said ball by stopping the oscillation of said first and second oscillating and rotatable surfaces at the conclusion of said wind period, immediately beginning thereafter the pause period for winding said thread along an arc lying in a single plane, electronically controlling the length of said arc, and thereafter starting a new program cycle immediately upon the conclusion of the preceding program cycle.

9. The method as defined in claim 8 which also includes the additional step of electronically controlling the number of the program cycles included in a complete cycle, said complete cycle being composed of said program cycles, and completing said winding by repeating a plurality of complete cycles and by continuing the rotation of said ball by means of said third rotatable surface for a predetermined period of time.

10. The method as defined in claim 8 which also includes the step of manually selecting the duration of the wind period for each program cycle, manually selecting the duration of the pause period for each program cycle independently of the duration of the wind cycle, and thereafter electronically controlling the individual durations of all the pause periods and the individual durations of all the wind periods in accordance with the prior manual selections of said periods.

11. The method as defined in claim 8 which also includes the step of adjusting the synchronization of the complete oscillation of said first and second oscillating and rotatable surfaces with the rotation of said ball to produce one complete revolution of said ball for one complete oscillation of said first and second oscillating surfaces.

12. The method as defined in claim 8 which also includes the step of adjusting the synchronization of said first and second oscillating and rotatable surfaces and of the third rotatable surface to produce more than one complete revolution of said ball for each complete oscillation of said first and second oscillating surfaces.

13. The method as defined in claim 8 which also includes the step of adjusting the synchronization of said first and second oscillating surfaces and of the third surface to produce less than one complete revolution of said ball for each complete oscillation of said first and second oscillating surfaces.

14. The method of rotating a spherical body for applying a winding to said body, said winding having a plurality of angularly spaced turns of a filamentary material, said method including the steps of continuously and uniformly rotating said body in the same direction about a first axis; rotating said body about a second axis approximately perpendicular to the first axis, the rotation of said body about the second axis being first in the first direction during the first period of time substantially equal and corresponding to the period of time required to obtain a first one-half revolution of said body about said first axis; and subsequently rotating said body about said second axis in the second direction, opposite to the first direction, during the second period of time substantially equal to the first period, said second period of time being substantially equal and corresponding to the period of time required to obtain the second one-half revolution of said body about said first axis, said second one-half revolution immediately succeeding the first one-half revolution, continuing the rotation of said body in the above manner about said first and second axes during a third predetermined period of time composed of a plurality of said first and second periods of time, rotating said body thereafter during a fourth predetermined period of time only around said first axis, and electronically controlling all of said four periods of time.

References Cited in the file of this patent

UNITED STATES PATENTS

| | | |
|---|---|---|
| 822,482 | Saunders | June 5, 1906 |
| 2,156,896 | Honig | May 2, 1939 |
| 2,194,132 | Voit et al. | Mar. 19, 1940 |
| 2,519,069 | Roberts | Aug. 15, 1950 |
| 2,607,540 | Rekettye | Aug. 19, 1952 |
| 2,761,684 | Crowley et al. | Sept. 4, 1956 |
| 2,789,821 | Crowley | Apr. 23, 1957 |

UNITED STATES PATENT OFFICE
CERTIFICATION OF CORRECTION

Patent No. 2,995,311                        August 8, 1961

Rudolph G. Holman

It is hereby certified that error appears in the above numbered patent requiring correction and that the said Letters Patent should read as corrected below.

Column 1, line 11, for "artilces" read -- articles --; line 56, strike out "cotton", second occurrence; column 2, line 3, for "indivadual" read -- individual --; column 6, line 22, after "may" insert -- be --; column 9, line 75, for "178" read -- 198 --; column 11, line 50, for "$\frac{2}{L}$" read -- $\frac{L}{2}$ --; column 15, line 21, for "1949" read -- 1849 --.

Signed and sealed this 3rd day of April 1962.

(SEAL)
Attest:

ERNEST W. SWIDER                        DAVID L. LADD
Attesting Officer                        Commissioner of Patents